Patented Mar. 13, 1951

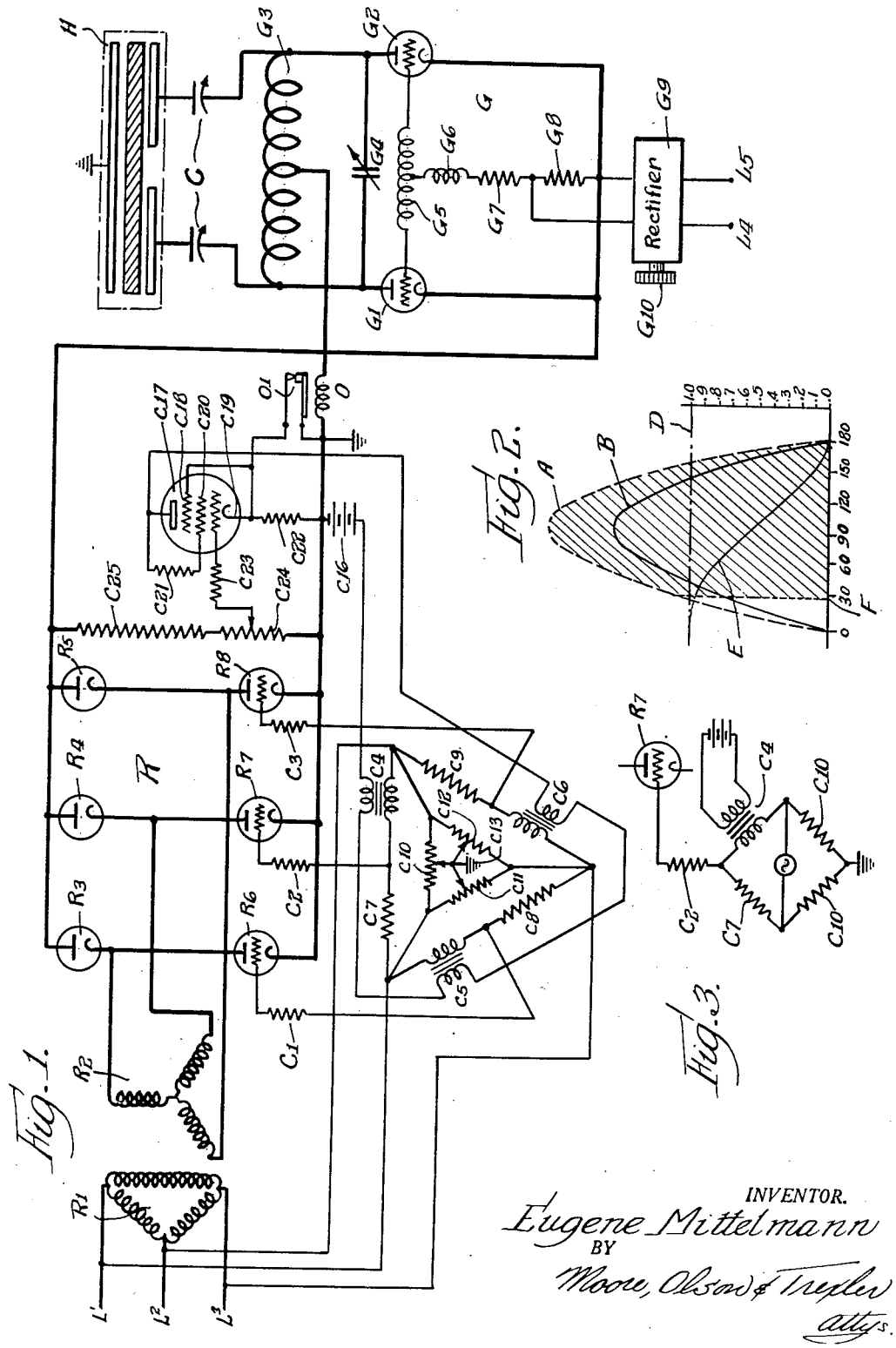

2,545,298

UNITED STATES PATENT OFFICE 2,545,298

RECTIFIER

Eugene Mittelmann, Chicago, Ill.

Application March 13, 1946, Serial No. 654,201

4 Claims. (Cl. 321—40)

The present invention relates to grid controlled vacuum tube rectifiers, and more particularly to such a rectifier for supplying power to a high frequency oscillation generator of the type which feeds high frequency energy to a variable load.

The load impedance imposed on an oscillator used in high frequency heating apparatus varies considerably in magnitude and phase from charge to charge and during each heating cycle. It has been found necessary to provide adjustable coupling means to vary the relation between the impedance of the oscillator and the impedance of the load in order to maintain a substantially constant flow of energy to the material being heated. It also has been found necessary to provide adjustable tuner means to maintain the operating frequency of the oscillator within relatively narrow limits in order to avoid communication interference and to maintain the oscillator in stable operation. If the oscillator or generator is supplied with power by means of a conventional rectifier, these load impedance variations and these compensating adjustments cause undesired variations in the voltage applied by the rectifier to the plate circuit of the oscillator and hence offset to some extent the compensations effected by those adjustments.

The voltage of the commercial power line feeding the rectifier frequently fluctuates so widely as also to offset the effect of those compensating adjustments. My invention contemplates the provision of control means to compensate for this line voltage variation as well as to compensate for the voltage variations occasioned by the change in the oscillator load impedance and the coupling and tuning adjustments.

In order that the rectifier output voltage may be restored to a predetermined voltage when the line voltage drops, it is necessary to design the rectifier for operation at a supply voltage considerably higher than the usual or standard line voltage value. The present invention contemplates the provision of a rectifier employing a grid controlled tube and means for delaying its ignition to such an extent that the average value of the voltage across its load resistor will be of the same magnitude as the average value of the output voltage which would be obtained from the standard line voltage when the tube operated throughout each entire positive half cycle of that line voltage.

It has been found desirable to operate a rectifier of this type at an anode voltage value thirty per cent higher than the standard value. This requires a grid control circuit which at normal line and output voltages delays the ignition point of the rectifier tube. The present invention provides a grid control circuit which varies the instant of ignition or conductivity of the rectifier tubes of a polyphase rectifier in accordance with the input and output voltages of the rectifier.

In the operation of high frequency oscillation generators a circuit breaker is provided for de-energizing the oscillation generator upon occurrence of an overload. It has been found, however, that frequently overloads are encountered which are self-correcting and of relatively short duration and that the generator could be maintained in operation, without harm thereto, if some protective means were provided for reducing the anode voltage of the oscillation generator during the momentary overload period.

In accordance with the present invention means are provided for automatically and instantaneously decreasing the output voltage of the power rectifier upon a sharp increase in the anode current of the oscillation generator.

It is, therefore, an object of the present invention to provide an improved polyphase, grid controlled, full wave, rectifier which will supply a substantially constant output voltage.

It is a still further object of the present invention to provide an improved three-phase full wave rectifier wherein one tube of each phase is of the grid type for controlling the output voltage to compensate for variations in the applied load or in the supply line voltage.

A still further object of the present invention is to provide in a high frequency oscillation generator heating system a rectifier control system or device which will maintain the anode voltage substantially constant at any selected value; instantaneously reduce or remove the anode voltage of the oscillation generator upon occurrence of an overload and instantaneously restore the anode voltage to its proper value if the overload is eliminated before the usual electro-mechanical circuit breaker opens the circuit.

Still another object of the present invention is to provide an improved control circuit for a grid-controlled rectifier.

Other and further objects of the present invention subsequently will become apparent by reference to the following description taken in conjunction with the accompanying drawing wherein—

Figure 1 is a circuit diagram illustrating the application of the present invention;

Figure 2 is a graph explanatory of a certain operation of the circuit shown in Figure 1; and Figure 3 illustrates the equivalent circuit for the control circuit of the grid controlled rectifier tubes forming a part of the circuit shown in Figure 1.

As shown in Figure 1, an oscillation generator G, employing a pair of vacuum tubes G1 and G2, supplies high frequency energy to a load such as the reactive heater H. The heater H is coupled to the oscillation generator G by a variable coupling such as the capacitors C which are connected to the tank coil G3 which is tuned by a capacitor G4. The oscillation generator may be of the tuned-grid tuned-plate type having connected between the grids a midtapped inductor G5. From the midtap of the inductor G5 a circuit is completed through an inductor G6, grid resistor G7 and grid bias resistor G8. The resistor G8 is adapted to be energized by direct current from a rectifier G9, the output voltage of which may be preselected by adjustable means G10. The rectifier G9 is energized from alternating current lines such as L4 and L5.

The anodes of the vacuum tubes G1 and G2 are supplied with suitable anode potential from a polyphase rectifier R which is connected between the cathodes and the midpoint on the tank inductor G3. The midpoint of the tank inductor G3 is maintained at direct current ground potential although the potential of the anodes is positive relative to the cathodes.

The rectifier R is of the bridge type and is energized from alternating current lines L1, L2 and L3 connected to the primary winding R1 of a transformer having a secondary winding R2. Each of the legs of the secondary winding R2 is connected to the common juncture between a pair of vacuum tubes. The cathodes of the oscillation generator tubes G1 and G2 are connected to the anode of three uncontrolled rectifier tubes R3, R4 and R5 which may be rectifier tubes of any suitable type of construction although in the present instance it has been found preferable to employ rectifier tubes of the gas-filled or ionizable type. A plurality of grid controlled rectifier tubes R6, R7 and R8 are connected respectively in series with the rectifier tubes R3, R4 and R5. Each of the latter rectifier tubes R6 to R8 is, preferably, also of the gas-filled or ionizable type and has a control electrode arranged to control the instant of ignition or of conductivity of the tube. For simplicity in considering the present arrangement it may be assumed that the rectifiers R6 to R8 are of the Thyratron type having heated cathodes and control grids. It, of course, will be appreciated that other types of control rectifiers may be employed.

Energy from the lines L1, L2 and L3 is supplied to a plural, phase shifting network or system containing three saturable reactors C4, C5 and C6. The juncture between the saturable winding of the reactor C4 and a resistor C7 is connected through a current limiting resistor C2 to the grid of the vacuum tube R7. The common juncture between the saturable winding of the reactor C5 and a resistor C8 is connected to the grid of the vacuum tube R6 through a current limiting resistor C1. The juncture between the saturable winding of the reactor C6 and the resistor C9 is connected through a current limiting resistor C3 to the grid of the vacuum tube R8. The saturating windings of the saturable reactors C4, C5 and C6 are connected in series with a direct current supply source C16. The amount of current supplied by the source C16 is controlled by a vacuum tube C17 which may be of the pentode type as shown in Figure 1. Where the vacuum tube C17 is of the pentode type, the suppressor grid C18 is connected directly to the cathode C19 of the tube. Suitable potential is applied to the screen grid C20 by connecting the screen grid to the anode of the vacuum tube through a series drop resistor C21. A suitable self-biasing potential is developed across a cathode resistor C22 which interconnects the cathode of the vacuum tube C17 with the positive output terminal of the rectifier R and the negative side of the source of potential C16. The grid of the vacuum tube C17 is connected through a current limiting resistor C23 to the adjustable contact of a voltage divider C24 which is connected in series with a resistor C25 across the output terminals of the rectifier R. The vacuum tube C17 is employed as a voltage inverter in order to cause such change in the current flowing through the saturating windings of the reactors C4, C5 and C6 as to reduce the current output of the rectifier R in response to an increase in the output voltage. The connection between the midpoint on the oscillation generator tank coil G3 and one side of the rectifier R includes the coil O of a fast operating, fast release relay having a pair of normally closed contacts O1 connected in shunt relation to the cathode resistor C22. When the current of the vacuum tubes G1 and G2 of the oscillation generator G exceed the rated value, the relay coil O attracts its armature to open the contacts O1 thereby applying a high negative bias to the grid circuit of the vacuum tube C17.

The common potential reference point of the grid control voltage for the three rectifier tubes R6, R7 and R8 is the positive side of the rectifier output circuit. Since this positive side is at direct current ground potential, a very convenient and stable common potential reference point is provided insuring, if the phase shifting system is properly balanced with respect to that point, a proper, equal division of load between the tubes of the three phases. This balancing can be simply accomplished by resistors C11, C12 and C13, each connected across one resistance-inductance phase shifting arm of the phase shifting system. The zero potential points of these resistors are connected in common to ground as at C13.

The transformer comprising the windings R1 and R2 is so designed that the voltage applied to the tubes of the rectifier R is of a value from twenty to thirty per cent greater than the standard alternating current voltage value required to produce the same direct current output voltage by means of a rectifier in which each tube operates during the entire time that its plate voltage is positive and of sufficient magnitude with respect to its cathode.

In Figure 2 the curve B represents a half cycle of alternating voltage of the standard value necessary to obtain the normal direct current output voltage. The curve A represents the normal alternating voltage applied to the plate of each rectifier tube by the transformer of the system of Figure 1. The line D represents the average direct current output voltage value which is obtained from the voltage B when the tube fires throughout the entire positive half cycle. The curve E represents the ratio of the average value of the output voltage obtained at different firing angles to the value D of the average output voltage obtained when the tube fires throughout the entire half cycle. These ratios are plotted in Figure 2 as a function of the phase angle at which ignition takes place. The steepest slope on the curve E occurs between thirty degrees and one hundred fifty degrees corresponding to a ratio of .58 to .05. For a ninety degree phase shift in the ignition of the grid control tubes, the ratio becomes .32. If a rectifier tube to which the plate voltage A is applied fires at the phase angle F, the average value of the direct current output voltage of the rectifier tube will be equal to the same average value D obtained from the normal alternating current voltage B when the tube fires throughout the entire half cycle. To illustrate this relation, the effective portion of the curve A has been cross-hatched, and this cross-hatched area is equal to the entire area of the curve B.

The curve B thus also represents the minimum value of alternating supply voltage for which the system can maintain the average output voltage value C. Any smaller applied voltage can not be corrected for the angle of flow is maximum for voltage B.

Within the limits of the phase shifting network, any voltage greater than B can be corrected by shifting the phase angle of ignition of the tubes. The normal plate voltage A is determined by the percentage of decreasing output voltage deviation likely to be encountered, i. e., the ratio E. The normal firing angle F is then selected from the curve E to give the required average output voltage D.

In the operation of the rectifier R, at least two of the vacuum tubes are conductive at any instant. For example, during one period the vacuum tubes R4 and R8 may be conductive. In the next period the vacuum tubes R4 and R8 will be conductive and these will in turn be followed by the tubes R8 and R3. Similar periods of conductivity occur for the various tubes until the alternating current supply voltage has gone through a complete cycle. It will be evident that the tubes R3, R4 and R5 conduct only when the tubes R6, R7 and R8 are conductive. The phase shift network provided for the control of the grid controlled vacuum tubes R6 to R8 constitutes a plurality of bridge networks. This will be evident from the single tube schematic circuit of Figure 3 in which the tube R7 has its grid connected through a current limiting resistor C2 to the juncture between the resistor C7 and the saturable winding of the reactor C4. The bridge is completed by the two portions of the resistors C10 having their common juncture connected to ground. One phase of the three-phase alternating supply voltage is applied across one diagonal of the bridge.

When the output voltage of the rectifier increases, due either to a line voltage increase or a change in load, the voltage across the resistors C21 and C22 increases thus applying an increased negative voltage to the grid of the vacuum tube C17. This increased negative voltage on the grid of the vacuum tube C17 reduces the direct current supplied by the source of potential C16 and flowing through the saturating windings of the saturable reactors C4, C5 and C6. This retards the moment of ignition of the grid controlled tubes by increasing their firing angle and thus reduces the output voltage of the rectifier R within the next half cycle of alternating current. On a decrease in output voltage, due to either line or load change, the firing angle is decreased to restore the output voltage to the proper value. The response characteristics of the arrangement shown in the preferred embodiment shown herein have indicated that for a total variation of seventeen per cent of the line voltage the power output voltage of the rectifier R did not vary by more than one per cent.

By adjustment of the wiper of the rheostat C23, the rectifier output voltage may be automatically maintained substantially constant at the required value for different power levels of oscillator operation—within the range of operation or power level adjustment of the rectifier.

Upon the overloading of the oscillator tubes G1 and G2, which is indicated by an anode current above the rated or safe value for the tubes, the relay O opens the contacts O1 and renders the cathode bias resistor C22 effective to apply a high negative bias to the grid of the vacuum tube C17. The plate current of the vacuum tube C17 is therefore reduced sharply. This change in the current through the saturable reactors of the grid control network rapidly reduces the power output of the rectifier R by increasing the firing angle of the tubes R6, R7 and R8. The response of the relay O is such that the power output of the rectifier R and the oscillator are reduced to safe values substantially instantaneously and within a period which is a small fraction of the time required to trip the protective circuit breakers which are conventionally associated with the oscillation generator G but omitted in the circuit diagram of Figure 1. As the oscillator plate current drops below the safe value by a predetermined margin, the relay contacts O1 reclose and the tube C17 causes an increase in the rectifier and oscillator output. If the overload condition has corrected itself the system continues to operate. If not, it again operates to reduce the power output. This succession of operations continues until either the overload condition is corrected or the circuit breaker operates. While the relay O has been shown as introducing the bias resistor C22 into the grid circuit of the vacuum tube C17, other relay or electronic circuit arrangements may be employed to reduce the current flowing through the vacuum tube C17.

While for the purpose of illustrating and describing the present invention, certain specific circuit arrangements have been shown in the drawing, it is to be understood that the invention is not to be limited thereby since such variations are contemplated as may be commensurate with the spirit and scope of the invention set forth in the following claims.

This invention is hereby claimed as follows:

1. A three phase full wave space discharge tube rectifier having a plurality of pairs of serially connected unidirectional conducting space discharge tubes, each pair of tubes including a tube having a control electrode, a control circuit for supplying control potentials to said electrodes including a three-phase, phase shifting network having a plurality of saturable reactors having their saturated windings in series, a source of saturating current for said saturating windings of said reactors, and a grid control space discharge tube having its anode and cathode in series with said windings for controlling the magnitude of current supplied by said source to said saturating windings, the grid of said control tube being connected to be responsive to a change of potential across the output of said rectifier.

2. A three phase full wave rectifier including three pairs of serially connected space discharge tubes, one tube of each pair having a control electrode, an excitation circuit for supplying control potentials to said electrodes including a polyphase network having a plurality of saturable reactors, a single source of saturating current for all said saturable reactors, a continuous-control space discharge tube for controlling the magnitude of current supplied by said source to said saturable reactors, said latter tube having a grid connected to be responsive to the changes of potential in the output of said rectifier, and means responsive to an overload current for changing the grid potential of said control tube so as to change current supplied to all said saturable reactors by said saturating current source thereby to produce a phase shift in the potential supplied by said excitation circuit to said control electrodes whereby to reduce the output voltage of said rectifier.

3. A full wave rectifier including a plurality of pairs of serially connected unidirectional conducting devices, one of said devices of each pair having a potential responsive control member, an excitation circuit including a plurality of bridge networks each connected to one of said control members for supplying control potentials to said members, and means responsive to the output voltage of said rectifier for simultaneously unbalancing said networks in one direction on an increase of the output voltage below a predetermined value and simultaneously unbalancing said networks in the opposite direction on a decrease of the output voltage below a predetermined value.

4. A full wave polyphase rectifier including a polyphase alternating current input circuit, a plurality of pairs of serially connected unidirectional conducting space discharge tubes, each pair of tubes including an uncontrolled tube having an anode and cathode and a controlled tube having a control electrode and an anode and a cathode, the anode of the controlled tube and the cathode of the uncontrolled tube of each pair being connected to the input circuit, a polyphase excitation circuit including a plurality of bridge networks each connected at opposite diagonal points to the alternating current input circuit and at other opposite diagonal points to the control electrode and the cathode of a controlled tube, and means responsive to the output voltage of the rectifier for simultaneously unbalancing said networks in one direction on an increase in the rectified output voltage of the rectifier and simultaneously unbalancing the networks in an opposite direction on a decrease in the rectified output voltage of the rectifier.

EUGENE MITTELMANN.

REFERENCES CITED

The following references are of record in the file of this patent:

UNITED STATES PATENTS

| Number | Name | Date |
| --- | --- | --- |
| 1,870,022 | Prince | Aug. 2, 1932 |
| 1,874,840 | Williamson | Aug. 30, 1932 |
| 1,926,280 | Griffith | Sept. 12, 1933 |
| 1,995,404 | Stoller | Mar. 26, 1935 |
| 2,101,802 | Winograd | Dec. 7, 1937 |
| 2,158,516 | McIntosh | May 16, 1939 |
| 2,196,680 | Milarta | Apr. 9, 1940 |
| 2,222,784 | Schierl | Nov. 26, 1940 |
| 2,288,338 | Willis | June 30, 1942 |
| 2,315,619 | Hutcheson et al. | Apr. 6, 1943 |
| 2,391,085 | Crandell | Dec. 18, 1945 |